United States Patent [19]

Miller

[11] 4,200,003

[45] Apr. 29, 1980

[54] MAGNETIC VISCOUS DAMPER

[75] Inventor: Donald L. Miller, Horseheads, N.Y.

[73] Assignee: Facet Enterprises, Inc., Tulsa, Okla.

[21] Appl. No.: 917,136

[22] Filed: Jun. 19, 1978

Related U.S. Application Data

[63] Continuation of Ser. No. 671,921, Mar. 29, 1976, abandoned.

[51] Int. Cl.² .................. F16F 15/10; F16F 15/22
[52] U.S. Cl. ..................... 74/574; 192/21.5; 74/573 F
[58] Field of Search ............. 74/573, 573 F, 574; 192/21.5, 70.17, 30 V; 188/1 B, 218 A, 73.5; 64/1 V; 335/271, 277; 310/156

[56] References Cited

U.S. PATENT DOCUMENTS

| | | | |
|---|---|---|---|
| 1,636,262 | 7/1927 | Troendly | 74/574 X |
| 2,635,483 | 4/1953 | Welsh | 74/574 |
| 2,650,684 | 9/1953 | English, Jr. et al. | 192/21.5 |
| 2,845,157 | 7/1958 | Gambell | 192/21.5 |
| 2,886,150 | 5/1959 | Seavey | 192/21.5 |
| 2,945,138 | 7/1960 | Strang | 310/153 |
| 3,906,266 | 9/1975 | Cowman | 310/74 X |
| 4,049,985 | 9/1977 | Sudler | 74/574 X |

FOREIGN PATENT DOCUMENTS

| | | | |
|---|---|---|---|
| 736808 | 9/1955 | United Kingdom | 74/574 |
| 544049 | 5/1977 | U.S.S.R. | 310/74 |

*Primary Examiner*—Samuel Scott
*Assistant Examiner*—Randall L. Green
*Attorney, Agent, or Firm*—Remy J. VanOphem

[57] ABSTRACT

Disclosed herein is a rotary viscous damper using a magnetic fluid as the damping medium. The damper comprises a permanent magnet rotor enclosed in a magnetically permeable housing. The magnetic fluid fills the space between the rotor and the housing and is held in place using magnetic forces generated by the magnet rotor. The torque of damper may be varied by changing the viscosity of the magnetic fluid or the level of the magnetic flux in the magnetic circuit.

1 Claim, 2 Drawing Figures

MAGNETIC VISCOUS DAMPER

This is a continuation of application Ser. No. 671,921, filed Mar. 29, 1976, now abandoned.

BACKGROUND OF THE INVENTION

Field of the Invention

Rotary dampers of various types and configurations are conventionally used on rotating machinery to inhibit the occurence of unwanted oscillations. These oscillations adversely affect machine performance and can result in permanent damage to the machine itself if left unchecked. Rotary dampers commonly embody a viscous fluid which impedes the undesired motion and absorbs the energy associated therewith. A primary problem associated with existing viscous dampers has been the mechanical seals which retain the viscous fluid in the damping chamber. These seals are subject to wear and eventually leak resulting in a loss of the damping fluid. Loss of the fluid degenerates the damping effectiveness of the device and the continued operation of the machine may cause serious damage as a result of the undamped oscillations.

A viscous magnetic fluid damper is disclosed herein which substantially reduces the leaky seal problem. The magnetic fluid is retained in the damper by magnetic forces and the requirement for mechanical fluid seals and their attendant problems are substantially eliminated.

Magnetic or ferromagnetic fluids are well known in the art and are commercially available. Briefly, magnetic fluids are a mixture of a high permeability material, such as iron or iron oxide in a fluid medium such as oil, grease, or other fluids. Since their conception, magnetic fluids have been used in a wide variety of energy absorbing devices, such as shock absorbers, fluid dampers, magnetic clutches and even for the recoil mechanism of large artillery pieces and guns. Typical uses of magnetic fluids may be found in U.S. Pat. No. 2,667,237 "Magnetic Fluid Shock Absorber" by R. E. Gunther (August, 1958), U.S. Pat. No. 2,669,325 "Energy Absorber" by A. Raines (February, 1954), U.S. Pat. No. 2,973,969 "Electrical Shock Absorbing System" by E. S. Thall (March, 1961), and U.S. Pat. No. 3,006,656 "Automatic Accessory Control for Magnetic Particle Shock Absorber" by B. H. Schaub (October, 1961). These patents ostensibly teach devices which utilize the variation in viscosity of the magnetic fluid with the intensity of the applied magnetic field, and embody electromagnets to control the intensity of the magnetic field. Raines, in U.S. Pat. No. 2,669,325, discloses a linear viscous damper for a gun recoil mechanism which uses permanent magnets and a magnetic fluid. Mechanical means are provided for varying the intensity of the magnetic field generated by the permanent magnets to adjust for change and climatic conditions.

SUMMARY OF THE INVENTION

The invention is a rotory viscous damper using a magnetic fluid as the damping medium disposed between a magnetic rotor and a magnetically permeable housing. The magnetically permeable housing forms a low reluctance magnetic path concentrating the magnetic field in the region between the rotor and the inner walls of the housing. The magnetic fluid is attracted to the region within the housing where the magnetic field is the greatest. The magnetic rotor has a nonmagnetic hub which effectively diminishes the magnetic field in the central or axial region of the damper where the apertures for receiving the rotating shaft are located. The magnetic field is sufficient to hold the damping magnetic fluid away from the apertures and within the housing.

The object of the invention is a rotory viscous damper which does not require mechanical fluid seals. Another objective of the invention is a rotory damper using magnetic forces for retaining the viscous fluid in the damper housing. Still another objective of the invention is a viscous damper having a permanent magnet rotor and uses a magnetic fluid as the viscous medium. These and other objectives will become evident from a reading of the following specification and claims.

DETAILED DESCRIPTION OF THE PREFERRED EMBODIMENT

Figure 1:
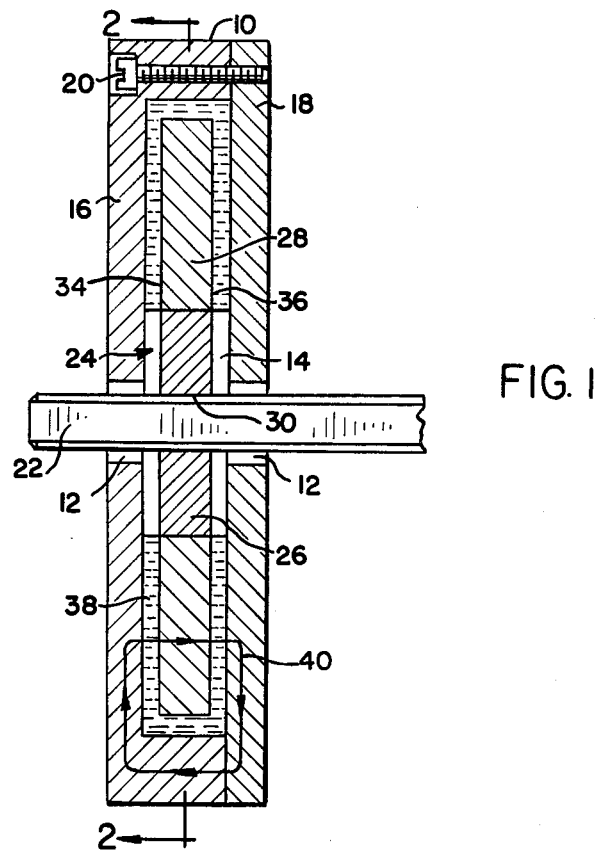
FIG. 1 is a cross sectional side view of the disclosed viscous damper.
Figure 2:
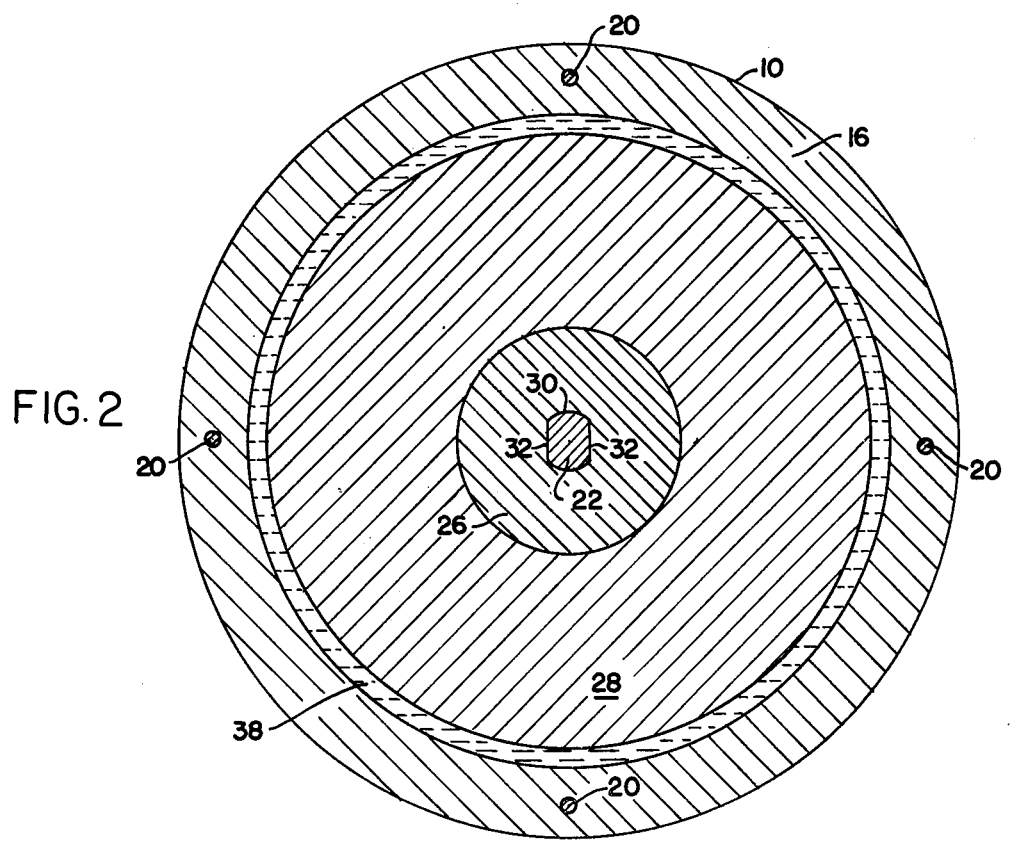
FIG. 2 is a cross sectional front view of the disclosed viscous damper.

The details of the preferred embodiment of the invention are illustrated in FIGS. 1 and 2. FIG. 1 is a cross sectional side view of the rotory damper, and FIG. 2 is a cross sectional plan view of the same embodiment.

Referring to FIG. 1, the damper comprises a Housing 10 having axial apertures 12 and an internal annular cavity 14. The Housing 10 is made from a magnetically permeable material and comprises cup shaped member 16 and Cover Plate 18 as shown. Any other suitable combination of structural members may alternately be used in the construction of the Housing 10. Member 16 and Plate 18 are securely fastened together to form a leak proof seal about the periphery using a plurality of Screws 20 disposed at regular intervals as illustrated in FIG. 2. However, rivets or any other types of fasteners known in the art including welding or brazing may also be used to join Plate 18 to member 16.

Shaft 22, the motion of which is to be damped, passes through the Apertures 12 and is attached to a Rotor 24 comprising a Hub 26 and an annular Magnet 28 disposed within the cavity 14. Hub 26 is made from a non-magnetic material such as aluminum, copper, or brass or a structural plastic and has an axial aperture 30 to receive Shaft 22. To insure rotation of the Rotor 24 with Shaft 22, the Shaft 22 may have flattened faces 32 as illustrated in FIG. 2 and the aperture 30 has a mating configuration. It is recognized that a single flat surface or other mating configurations between the Shaft 22 and aperture 30 will equally serve the same purpose. It is not intended that the invention be limited to the configuration shown. The Hub 26 may be pressed onto Shaft 22, or may be locked in place using set screws (not illustrated) as is well known in the art. The outside diameter of the Hub 26 is larger than the diameter of apertures 12 so that the extremeties of the Hub 26 extend part way into the internal cavity of the Housing 10. The width of the portion of the Hub 26 extending into cavity 14 is slightly less than the distance between the internal surfaces of Housing 10 so that the hub is free to rotate within the cavity without touching the walls.

The annular Magnet 28 is made from a permanent magnetic material and is fixedly attached to the Hub 26 as shown. The magnet 28 may be pressed, fused or bonded to the hub using a suitable bonding agent such as an epoxy cement. The method for attaching the permanent magnet to the hub is immaterial to the invention as long as the hub and magnet are joined to form an integral assembly. The outside diameter of the Magnet 28 is slightly less than the internal diameter of cavity 14, and the width of the Magnet is slightly less than the distance between the internal surfaces of Housing 10, so that the entire rotor 24 is free to rotate within the internal cavity of housing 10 without touching the walls. The width of the annular magnet may be the same as the mating portion of the hub, but may be different. The permanent magnet 28 is magnetized so that its opposite faces 34 and 36 are of opposite magnetic polarity.

A magnetic fluid 38, such as discussed in the article "Magnetic Fluids" in *International Science and Technology*, July, 1966, pages 48–56 and commercially available from Ferrofluidics Corporation of Burlington, Mass., is disposed in cavity 14 and fills the space between the annular magnet 28 and the internal walls of Housing 10.

The path of the lines of magnetic flux between the opposite magnetic poles of magnet 28 (magnetic circuit) pass through the magnetic fluid 38 and the magnetic permeable material of Housing 10 as illustrated by closed path 40. The arrows indicate the direction of the magnetic lines of flux. Because the hub 24 is made from a non-magnetic material there is little or no magnetic field in the area adjacent to the surfaces of the hub and the magnetic field is concentrated in the area adjacent to the annular magnet 28. The magnetic fluid 38 is attracted to the region where the magnetic field is most intense and because the magnetic fluid has a higher magnetic permeability than air, its presence in the space between the Magnet 28 and the internal surfaces of the magnetically permeable walls of Housing 10 serves to further increase the intensity of the magnetic field in this region. The magnetic forces generated between the magnet 26 and the magnetic fluid 38 holds the magnetic fluid in the region proximate the permanent magnet 28. The non-magnetic hub provides a relatively force free region completely around the aperture 12 further increasing the containment of the magnetic fluid in the cavity adjacent to the magnet 28. The torque of the damper may be controlled by varying the viscosity of the magnetic fluid or by using a rotor having a different magnetic strength (flux density). These features give increased flexibility and utilization of comparable non-magnetic viscous dampers.

Having disclosed the invention with reference to the preferred embodiment, it is not intended that the invention be limited to the details illustrated and discussed herein. It is recognized that the shape of the rotor and housing may be changed without departing from the spirit of the invention. Further, other features such as mechanical seals for preventing dust and other materials from entering the housing and contaminating the magnetic fluid may be added without detracting from the invention.

What is claimed is:

1. An unsealed magnetic viscous damper for reducing the unwanted oscillations of a rotating shaft comprising:
   a magnetic permeable housing enclosing a cylindrically shaped cavity having an axis of symmetry, said housing having shaft clearance apertures passing through the walls of said housing concentric with said axis of symmetry, said clearance apertures having a diameter larger than the diameter of the rotating shaft;
   a permanent magnet rotor disposed in said cavity and rotatable therein, said rotor having an annular configuration with an external diameter smaller than the diameter of said cylindrical cavity and an internal diameter larger than the diameter of said apertures;
   a magnetic fluid disposed in said cavity filling the space between said rotor and the internal walls of said cavity; said magnetic fluid being a viscous connection between said rotor and said housing; and
   a non-magnetic hub disposed in said cavity and fixedly connected to said rotor, said hub having means for receiving the rotating shaft passing through said apertures of the housing and rotating said rotor with the rotation of the shaft, said non-magnetic hub having a diameter larger than the diameter of said apertures and causing a magnetic field free region about said apertures, said magnetic field free region about said apertures confining said magnetic fluid to the immediate vicinity of said rotor, thereby eliminating the need for mechanical seals.

* * * * *